I. W. HEYSINGER.
Curtain-Fixtures.

No.155,614. Patented Oct. 6, 1874.

Witnesses:
Stanley Williams,
A. M. Sallade Jr.

Inventor:
I W Heysinger
by A. M. Stuart his atty

UNITED STATES PATENT OFFICE.

ISAAC W. HEYSINGER, OF PHILADELPHIA, PENNSYLVANIA.

IMPROVEMENT IN CURTAIN-FIXTURES.

Specification forming part of Letters Patent No. 155,614, dated October 6, 1874; application filed July 24, 1873.

*To all whom it may concern:*

Be it known that I, ISAAC WINTER HEYSINGER, of Philadelphia, county of Philadelphia and State of Pennsylvania, have invented certain Improvements in Window-Curtain Fixtures, of which the following is a specification:

The nature and object of my invention will be understood from the following specification, in which reference is made to the accompanying drawings, in which—

Figure 1:
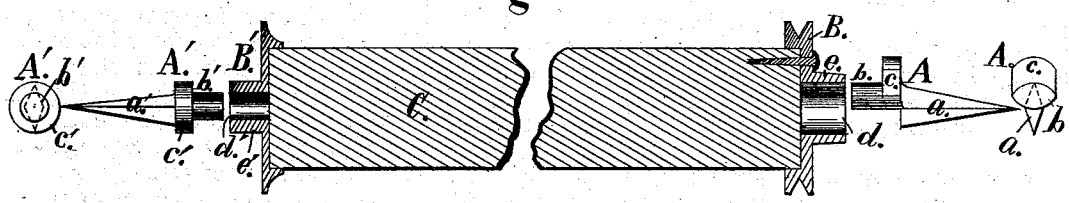
Figure 2:
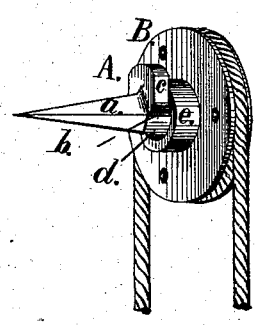

Figure 1 represents a longitudinal vertical section of a curtain-roller and a cord-pulley on the end thereof, and a disk upon the other end, and side views of the supports for the pulley and disk, respectively; and Fig. 2 is a side view, in perspective, of the pulley mounted upon its support.

The pulley B and the disk B' are each provided with a socket on the inner side for an end of the curtain-roller C, and are in the usual form, except that each has a box or hub, as shown, for the reception of the spindle of its support, so that, when the roller C is revolved in use, the cord to which the force to turn it is applied is almost immediately above the spindle upon which the roller turns.

This construction and arrangement secures steadiness of operation in rolling and unrolling the curtain.

The box does not necessarily extend entirely through either the pulley B or the disk B'. The support for the pulley B is provided with a shank, $a$, tapered and flattened, as shown, an elevated shoulder, $c$, and a spindle, $b$, the upper surface of which conforms in curvature to the inside of the hub $e$. The shank $a$, as well as the shank $a'$, of the support of the disk B' is made in the form shown, in order that it may be driven, as a nail, into the wood of the jamb of the window, edge up, so that it may not split the same, or be likely to turn therein. When driven in this way, but few of the fibers of the wood are cut by it, and the ends of such as are cut will support the lower edge of the shank, so that it will not yield to the pressure of the cord, and thus it will remain perpendicular to the jamb.

It is obvious that if the two supports are once inserted in such a manner that the spindle shall be in line with the center of the curtain-roller, and the proper distance apart, the mounting and operation of these fixtures are most convenient and steady.

The bearing of the disk B' has a simple round spindle and a collar, against which the hub $e'$ abuts, and the hub $e$ of the pulley B, being made large for the purpose, while the hub $e'$ is being slipped over spindle $b'$, is furnished a temporary support upon shoulder $c$, and afterward it falls upon spindle $b$, upon which it revolves in use.

What I claim as my invention is—

1. The combination of the pulley B, provided with the box or hub $e$, and the support for the same, provided with the shank $a$, shoulder $c$, and spindle $b$, each constructed substantially as and for the purpose described.

2. The combination of the pulley B, having the hub $e$, and the support A, with the disk B', having the hub $e'$, with the support A', substantially as described and set forth.

I. W. HEYSINGER.

Witnesses:
JOHN H. SPACKMAN,
P. O'DONNELL.